US008886800B2

(12) United States Patent
Vøien

(10) Patent No.: US 8,886,800 B2
(45) Date of Patent: Nov. 11, 2014

(54) SYSTEM AND METHOD FOR TRAFFIC ANALYSIS

(75) Inventor: Thomas Vøien, Oslo (NO)

(73) Assignee: Online Userfacts AS, Oslo (NO)

( * ) Notice: Subject to any disclaimer, the term of this patent is extended or adjusted under 35 U.S.C. 154(b) by 0 days.

(21) Appl. No.: 13/822,509

(22) PCT Filed: Sep. 13, 2011

(86) PCT No.: PCT/NO2011/000247
§ 371 (c)(1),
(2), (4) Date: Mar. 12, 2013

(87) PCT Pub. No.: WO2012/036557
PCT Pub. Date: Mar. 22, 2012

(65) Prior Publication Data
US 2013/0173793 A1 Jul. 4, 2013

(30) Foreign Application Priority Data
Sep. 13, 2010 (NO) .................................. 20101278

(51) Int. Cl.
G06F 15/16 (2006.01)
H04L 12/26 (2006.01)
H04L 29/08 (2006.01)
G06Q 30/02 (2012.01)

(52) U.S. Cl.
CPC .............. H04L 43/062 (2013.01); H04L 67/22 (2013.01); H04L 67/2819 (2013.01); G06Q 30/02 (2013.01)
USPC .............................. 709/224; 709/223; 370/252

(58) Field of Classification Search
CPC .... H04L 67/22; H04L 43/062; H04L 67/2819
USPC ........... 709/200–203, 217–227, 228; 370/252
See application file for complete search history.

(56) References Cited

U.S. PATENT DOCUMENTS 6,816,456 B1 * 11/2004 Tse-Au ....................... 370/230.1
7,783,740 B2 * 8/2010 Siorek et al. .................. 709/224

(Continued)

FOREIGN PATENT DOCUMENTS

DE  10 2007 002 533 A1  8/2008
GB  2464528  4/2010

OTHER PUBLICATIONS

International Search Report issued Jan. 18, 2012 in corresponding International Application No. PCT/NO2011/000247.

(Continued)

Primary Examiner — Moustafa M Meky
(74) Attorney, Agent, or Firm — Wenderoth, Lind & Ponack, L.L.P.

(57) ABSTRACT

A system for traffic analysis which includes an analyzer, a content source and a user terminal, and an authentication mechanism that allows or rejects the connection of the analyzer in a traffic flow between the content source and the user terminal. The analyzer includes a storage device for storing at least parts of the traffic and a questionnaire generator that uses the recorded traffic data to generate a questionnaire with questions only regarding services or content accessed by the user terminal. The response may include parameter values that are filled in by a user or parameter values that are filled in by the user terminal. Traffic data and response from multiple user terminals can be stored for later analysis.

14 Claims, 7 Drawing Sheets

(56) References Cited

U.S. PATENT DOCUMENTS

2002/0029154 A1* 3/2002 Majoor .............................. 705/1
2005/0071445 A1* 3/2005 Siorek et al. .................. 709/223
2008/0260120 A1 10/2008 Minodier et al.
2010/0169803 A1* 7/2010 Mazzei et al. ................ 715/760

OTHER PUBLICATIONS

International Preliminary Report on Patentability and Written Opinion of the International Searching Authority issued Mar. 19, 2013 in corresponding International Application No. PCT/NO2011/000247.

* cited by examiner

SYSTEM AND METHOD FOR TRAFFIC ANALYSIS

TECHNICAL FIELD

This present invention relates to a system and a method for traffic analysis. In particular it is disclosed a system for data traffic analysis comprising an analyzer, a content source and a user terminal. It is further disclosed a method for data traffic analysis of data traffic between a content source and a user terminal.

BACKGROUND ART

A supplier of services and/or content generates traffic in a telecommunication network. This traffic is received by a user terminal. The services and content covered in this description may be telephone-based, such as services from a customer care department, or an account statement read by a speech generator, internet-based, such as HTML, XML or Java code from a web server or video-based such as real-time multicast, broadcast and video on demand etc. The various types of data sources are naturally adapted to the service and/or content delivered, but for the purpose of this description any device that sends data on a network is referred to as a "content source." The term "user terminal" is similarly used to describe any device that receives traffic, e.g. services and/or content, from i.e. a telecommunication network. The term "user terminal" therefore includes in this description phones, mobile phones, computers with web browsers, VCRs and any other device that can receive data from a telecommunication network.

Please note that certain user terminals, i.e. a computer with a browser, can have several features in common with certain content sources, such as a computer with a Web server. In these cases the terms "user terminal" and "content source" are used to specify which role they play in the network, and any known technical device or other type of equipment sending and/or receiving data are covered by these terms.

A supplier of services and/or content will from time to time have the need to analyze traffic related to the service and/or content provided. The purpose of a traffic analysis could e.g. be to measure the performance in one form or another, for example, to dimension the content source and/or modify traffic based on measured performance and/or to measure user response to new content or a new service. "Performance" should be interpreted broadly and may i.e. include response times, readability (code quality), a user's subjective perception of a Web page, etc. In some applications it is therefore relevant to measure users' subjective perception of the content or service in addition to technical parameters.

Any statistical analysis collects data representing one or several variables or parameters in a number, the following N, mutual independent experiments. Then may i.e. different hypotheses be tested and/or each parameter's effect on the overall result be estimated.

Telecommunication traffic represent a significant amount of data, especially if several parameters for each session between a content source and one or multiple (simultaneous) user terminals/users is to be registered, stored and analyzed.

The first high-level example of a service can be a website or a cable-TV provider delivering a video on demand service. Assume that the provider wants the video to be displayed to the user within a predetermined time limit, and that the practical data speed through the net is sufficient for the user to see the video uninterrupted while the remaining part of the video is downloaded in the background. It will be of interest for a provider of such services to measure a variety of parameters, such as e.g. initial loading time and number of interruptions. These and other parameters may be obtained from the user terminal without the user's involvement. There is a need to obtain data from a representative sample of user terminals in order to compile relevant statistics.

The second high-level service example is "social media" services, where users themselves provide name, age, gender and other information to the service. This information will later be used to present targeted advertising. The value of the ads will increase for advertisers, because the ads are presented to selected targeted users, in effect providing that i.e. teenage girls don't see the same ads as middle-aged men and vice versa, making the users perceive the advertisement messages as more relevant than they would otherwise have been. In order to attract readers in high volumes the service and website need to be perceived as relevant, useful and/or attractive as possible. The goal of attractiveness will fail if the web site contains a lot of irrelevant advertisements and other elements perceived by users as noise. The service provider may in this case want to measure how long the average user stays on the site, how the site actually looks in different browsers and/or a user's subjective perception of advertising and other site content.

Google Analytics is a tool to log how users use a website. The logs can in turn be analyzed in several dimensions, such as showing where user come from, which pages the users visited on the site, how long users stayed on any given web page etc. This system is today one of the most common web analytics tools providing quantitative analysis of web users use of web sites based on technical tracking logs.

Analyzing high-level traffic data offers inherit challenges. For example, register which web pages that were sent to which user, recording telephone conversations and other related user behaviour may be in conflict with both national regulations and the supplier's privacy policy. It is at the same time important to ensure a representative sample size from a population to provide reliable analyzes.

Unauthorized tracking of a user's Internet behaviour using the so-called spyware in the purpose of analysis and sending unsolicited advertising, so-called spam, is a widely known problem. Such unauthorized user tracking is at best perceived negatively and can be used for fraud or other criminal purposes. A professional supplier of content and/or services will usually not want to be associated with such activities.

A given number of dynamic parameters involving high-level traffic are not necessarily relevant in analyzing traffic. For example, analyzing traffic to and from a particular website may be relevant in one given study, while other, older and/or more proven web sites may be irrelevant. To simplify the analysis and improve precision such irrelevant parameters may be filtered out in the collection phase of the study, rather than first saving the data and then discard it in the analysis phase.

In the following the term "one question" is used to describe a request for a given (statistical) parameter for a given webpage, website or service. Request for the same parameter, i.e. response time, from two different services are therefore two different questions. Similarly, requests for two different parameters, i.e. response time and a user's subjective perception of one service, are two separate questions. A collection of such questions is in the following called, "questionnaire". It should be noted that some parameter values asked about in such a "survey", for example response time and other time values, code quality, etc., may partly be filled in by the user terminal without human intervention, while other parameter values, such as subjective perceptions of the content on a Web page, must be supplied by a user. In both cases the returned response will derive from the user terminal.

One purpose of the presented invention is therefore to provide a solution that avoids the aforementioned problems seen in known technology, namely a solution to achieve representative high-level traffic between a content source and a user terminal where privacy and/or anonymity matters are addressed.

Another aspect of the presented invention is to increase the accuracy of the analysis by removing noise from irrelevant parameters.

SUMMARY OF INVENTION

This is achieved according to the presented invention by providing a system for traffic analysis that comprise an analyzer, a content source and a user terminal specified by an authorization mechanism adapted to allow or reject the presence of the analyzer in a traffic flow between the content source and user terminal, and where the analyzer comprise a storage device to store at least parts of the traffic, a questionnaire generator with traffic data as input and a questionnaire only requesting relevant parameters based on the mentioned traffic data as output, and a communication device for obtaining the response from the user terminal, where the response is based on the questionnaire.

According to one aspect of the invention the system further comprises means for acquisition and analysis of a number of user responses.

According to another aspect of the invention the questionnaire generator is logically connected with a database comprising a plurality of questions in the form of ordered pairs {SERVICE, PARAMETER} where SERVICE represents a SERVICE and/or a content which shall be the subject of an analysis and PARAMETER represents a measuring parameter for SERVICE, as the set comprises all values for SERVICE which shall be analysed and at least one parameter per SERVICE.

According to yet another aspect of the invention the system further comprises conditional test means for carrying out a logical test where Web pages represents input data and the output represents original Web pages routed to a user terminal, or
the output represents changed Web pages routed to a user terminal. The conditional test means may be made up from system parameters set by a supplier prior to the data traffic analysis.

The invention comprise from another aspect a method for traffic analysis of traffic between a content source and a user terminal, specified by the steps to obtain authorization for the collection and storage of traffic data, if and only if authorization is obtained to connect an analyzer between the content source and the user terminal to record and save at least some traffic on the analyzer, using the recorded traffic data to generate a traffic-based questionnaire and to obtain feedback from the user terminal using the questionnaire.

Representative data can be ensured by various forms of authorization, for instance a user panel where users may allow comprehensive data collection in exchange for an incentive, or that the supplier authorizes data capture in which individual users may not be identified. Relevance is ensured by the use of a questionnaire in which only relevant data or parameters are captured. Irrelevant parameters are not included in the collection of parameters sent to the user terminal, and therefore does not generate noise in the subsequent analysis.

According to one aspect of the invention the results of the analysis are used to adjust the selection of relevant parameters, i.e. the questionnaire, in additional analysis.

According to another aspect of the invention the method further comprises to acquisition and analysing a plurality of responses.

According to yet another aspect of the invention the method further comprises to establish a graph with Web pages as nodes and edges representing data traffic between Web pages based on the user responses, where each node and each edge includes at least one attribute.

According to yet another aspect of the invention the method further comprising to revise questions and updating a set with possible questions.

According to yet another aspect of the invention the method of recording traffic data comprises:
  receiving a Web page from the content source;
  converting relative addresses to absolute addresses;
  storing all elements of the Web page in the analyzer, and
  forwarding the Web page from the analyzer to the user terminal.

According to yet another aspect of the invention the method further comprising to generate an illustration of the received Webpage in an image format. According to this aspect of the method the method further comprising to decode executable code on the Web page for generation of static XML code for presentation.

According to still another aspect of the invention the method further comprising the steps of:
carrying out a conditional logical test where Web pages represent input data and the output represents the original Web pages routed to a user terminal, or
the output represents the changed Web pages routed to a user terminal.

BRIEF DESCRIPTION OF DRAWINGS

The present invention will be described below with reference to the attached drawings, in which.

DETAILED DESCRIPTION OF INVENTION

Figure 1:
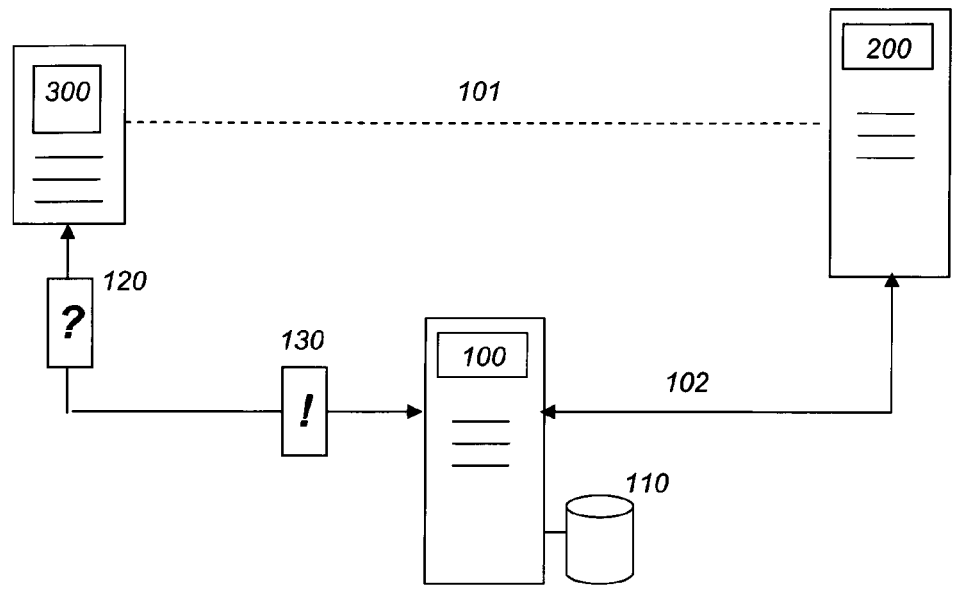
FIG. 1 is a schematic representation of one aspect of a system according to the invention.

FIG. 1 is a schematic representation of one aspect of the invention, where a system for traffic analysis includes an analyzer 100, a content source 200 and a user terminal 300. Content source 200 can deliver content that can be understood by humans, such as Web pages, video and/or audio over a logical connection 101 through a network, such as the Internet or an intranet, to the user terminal 300. The user terminal 300 can, as mentioned in the introduction, be any device that can receive content from the source 200, e.g. a PC, a TV decoder, a mobile phone or handheld device that can receive and display/play out text, graphics, video and/or sound in a form that easily can be understood by a human. Both the content source 200 and user terminal 300 are, as mentioned in the introduction, well-known devices and are therefore not described in detail in this section.

An authorization mechanism is adapted to allow or reject the presence of the analyzer 100 in a traffic flow between the content source and user terminal. FIG. 1 assumes authorization has been granted. The traffic flow 102 from the source 200 to the user terminal 300 flows through the analyzer 100. This is illustrated in FIG. 1 by the original logical connection 101 drawn as a dotted line, while the connection 102 through the analyzer 100 is drawn as a solid line. Connections 101 and 102 are logical connections, e.g. at the application layer in a protocol stack. Physical connections between the devices, and a number of other details, are not shown in the figure for the sake of clarity, but are nevertheless necessary in practical aspects of the system.

The analyzer 100 includes a storage device 110 to store at least some of the traffic 102. The storage device 110 is shown schematically as a cylinder, and can be a data file, a database or other suitable storage formats on a physical medium such as magnetic disks, solid state memory, RAM etc. Physical storage medium and form must be selected and dimensioned to be able to store necessary data from the traffic flow 102.

The analyzer 100 also includes a questionnaire generator (FIG. 4) with traffic data from the flow 102 as input. A questionnaire 120 according to the invention will:
  i. only contain questions based on relevant parameters depending on what content that is transmitted from the source 200 to the user terminal 300, and
  ii. only be sent to the user terminal 300 if the user terminal has accessed a certain service or certain content.

The questionnaire 120 is answered by the user terminal 300, preferably with input from a human user. The response from the user terminal 300 is schematically presented in 130. The responses can be stored in the analyzer's storage device 110 or an equivalent storage device for further analysis. The questionnaire can in a web environment appropriately be transmitted in XML format. In phone or cable-TV applications other data formats may be more appropriate. It should therefore be noted that any form of data request 120 and any response 130 can be used with the invention, and that the questionnaire 120 contains requests for a variety of application-dependent parameters, while the response 130 in addition contain a range of parameter values or attributes.

As mentioned above, the precision is increased and the subsequent analysis is simplified since the analyzer 100 monitors which services that are accessed from a user terminal 300, and only will send a questionnaire with relevant questions to the analyzer or user terminals 300 that have used that particular service or received that particular content. Note that the precision level increases especially if the questionnaire contains questions to be answered by a user, since a human being cannot be expected to respond accurately to a variety of questions that are perceived as irrelevant if the user have not visited a certain website or used a particular service in question for analyses, or if the questionnaire contains several questions relating to parameters that are irrelevant to the user or the services that actually have been used and the actual content in question for analyses.

The analyzer also includes a communication device to obtain the response 130 from the user terminal. This response is based on the questionnaire. The answers or responses can for example be transferred as XML data in pairs "parameters"="value". The storage unit can, as mentioned above, in some aspects of the invention include a database, and it is conceivable that applications where it will be appropriate to receive responses in a format where, for example a given field with a permanent place in a record or data structure can represent a given parameter value. In both cases the parameter values in the appropriate response can be stored in storage device 110 or in a separate, similar storage device. The term "communication device" is intended to include all types of interpreters implemented in software and/or hardware that are able to receive a response from the user terminal 300. The communication device can optionally save the received responses in the storage device 110 or forward it to another device. The collected data must in either case of course be made available for analysis.

According to one aspect of the invention the system contains a module for collecting and analyzing several responses from users. This module can be located in the analyzer 100, or elsewhere, and can be used to calculate distributions, mean values, variance and other statistics based on the received responses 130.

According to some aspects of the invention the module for collection and analysis of user responses can create a graph. This is described in more detail in FIG. 3 below.

The system can furthermore include a feedback loop from the content source 200 to the analyzer 100. The purpose of such a feedback loop will typically be to look into/measure details or for other reasons change the selection of parameters in a given survey based on the results from a previous analysis. The feedback loop can be fully automatic or involve manual changes of the parameters/questions in a questionnaire, for example through a webpage.

Figure 2:
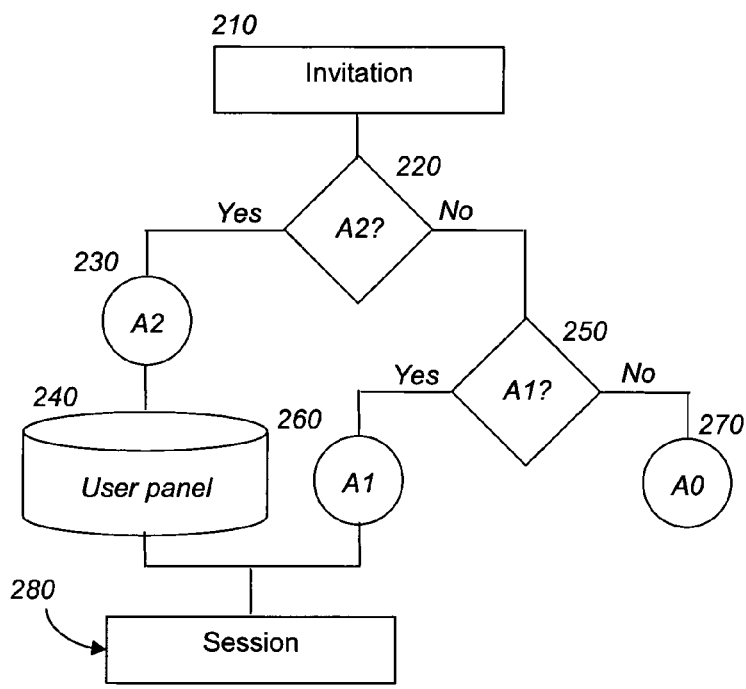
FIG. 2 shows an authorization mechanism.

FIG. 2 shows another aspect of the invention of a graded authorization mechanism for use in the present invention, in which users are assigned authorization level A0, A1 or A2, where A0 represents that the user does not authorize logging and A2 authorizes the most extensive logging. The idea behind this aspect of the invention is that the user can decide whether he or she allows that (anonymous) information about the use of internet, phone services, SMS services, etc. are logged for analysis purposes.

Assume that the supplier wants to include two groups of participants in a survey:
  Authorization level A1: Users that allows automatic logging of their use of networks and services in one session, and
  Authorization level A2: A panel of users who are willing to more comprehensive registration and/or reporting, and that by participation in the panel agree to participate in multiple surveys.

In block 210 an authorization request is sent to the users for authorization level A2. Practically such request may be sent in from an invitation containing information about the requirements to participate in a user panel, for example that one agrees to participate in more surveys at a later point in time, and information about the incentives in the form of e.g. discounts, free service access etc. Users who accept this invitation in 230 will be grated authorization level A2, which provides the supplier with the maximum access level to obtain information about the users' use of services and/or content, etc.

Used in a web environment the invitation can e.g. be a banner or a similar element on one or several sites. Used in other ways the invitation may be sent by email or using other methods. FIG. 2 shows the invitation as an introduction to a session 280 with the use of content or service. In other aspects of the invention the invitation can be sent after such a session.

The question of whether to participate in multiple surveys, implicating authorization level A2, is shown by test 220.

Users who agree to participate in multiple surveys are granted authorization level A2 at 230. Information about parameters such as gender, age, residence and so on are recorded and stored for later use at 240.

Not all invitees will accept to join a user panel, but they may still be interested in participating in one single study. This is illustrated in test 250.

Users who accept the invitation to participate in one study may for example be subject for automatic logging, and will therefore receive a lower compensation, usually represented by one single price/benefit. An invitation to participate at a lower authorization level, in A1, can practically e.g. be a website or advertisement of the type "take part in our survey and win . . ." Users who accept this invitation, responding positively to test 250, is in this aspect of the invention shown in FIG. 2 granted authorization level A1, which in this example may give the supplier the rights to obtain information automatically, but not necessarily based on the same requirements as for a panellist. Users who do not accept the invitation, responding negatively to test 250, is given granted authorization level A0 in this aspect of the system, which limits the supplier's access to obtain information that otherwise with user's consent could be obtained. This includes, for example anonymous traffic data, such information is otherwise necessary for e.g. billing and similar purposes. Authorization Level A0 displayed in this aspect of the invention must not be interpreted as if the supplier cannot collect any information from the relevant user terminal.

In a web environment users can be presented to the tests 220 and 250 in the same web form, for instance where the user is asked to tick a) to participate in a user-panel (A2) or b) to participate in one survey (A1).

In one aspect of the invention the authorization mechanism may be located at the supplier, and automatically assign the corresponding level A0 from the previous aspect of the invention to a representative sample of users or terminals. In this aspect of the invention the supplier will typically anonymize the user or avoid register data that may identify the user for reasons of privacy and due to the potential negative publicity that would derive if the public should be made aware or suspect that a provider stores information about individual user's usage of their services. This is analogous with storing information for billing purposes and the registration of traffic at lower layers in the protocol stack. Both cases are legitimate and are normally not in conflict with applicable legislation or common law.

Figure 3A:
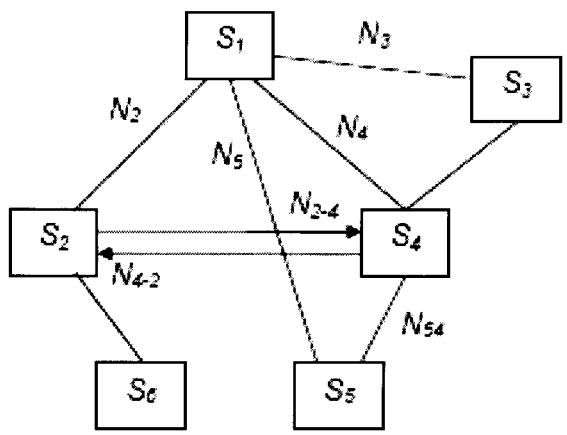
FIG. 3a illustrates a graph for collecting and presenting data.

FIG. 3a displays a graph, which is a data structure suitable for the purpose of illustrating the collection and presentation of data. The graph includes nodes and node attributes representing properties or parameter values associated with the node. The nodes are connected by edges and edge attributes representing properties or parameter values associated with the edge.

Assume that the node $S_1$ in FIG. 3a is a source node or a central node, for example a logical address (URI) on a Web server running on a computer. To simplify it is assumed that the computer in this example has one IP address, web pages with different addresses are available from the Web server on TCP port 80 for the content provider's customers, and that port 81 is used to manage the Web server. Assume furthermore that we want to analyze traffic from web pages where the first part of the absolute URL (URI) is "www.dummy.com/exmpl/ . . ." In this example the following three relevant attributes on the node are 1) the IP address, 2) the TCP port, and 3) the URI. It will vary from application to application if a node is to represent the entire machine, i.e. all traffic from a given IP address, the web server at large, e.g. all traffic from port 80 on the machine, all traffic from a domain, in this example "www.dummy.com", or from parts of the site, e.g. www.dummy.com/exmpl/ . . . In this example there will therefore be several nodes having value 80 as attribute 2) TCP port, and several nodes having the computer's IP address as attribute 1) IP address.

Similarly a node $S_2$ may have attributes for 1) IP address that represents a user's PC, 2) TCP port that separates browser traffic from other traffic, and 3) the URI to separate sites to be analyzed by those not to be analyzed. It should be noted that a source node and a user terminal in a different application could be identified with a phone number, MAC address, SIM card number, etc. A questionnaire generator, briefly described in relation to FIG. 1, may in all cases use the node's attributes to ask questions only to users who have accessed a particular service, e.g. a URI or a subset of URIs delivered on port 80. In the following the node $S_1$ represents a subset of URIs that will be analyzed.

Once traffic is recorded to a node, e.g. on a user terminal 300 (FIG. 1), the system checks whether the node is already in the data structure or graph. If the node does not exist, a new node is created. In the example in FIG. 3a the nodes $S_2$-$S_6$ can have been created in this way. It should be noted that when traffic is recorded from an additional new node $S_7$ will be created etc. The graph shown in FIG. 3 is therefore only an example and the number of nodes in a graph is not by any means limited to six nodes. The nodes may have several attributes storing parameter values of interest, e.g., 4) "time to load the first frame in an on-demand video stream", 5) "the number of interruptions," 6) "time on site", 7) any subjective opinions or impressions from a user and so on discussed above. In some aspects of the system may geographical, topological or logical location in a physical network be useful. As described in relation to FIG. 2 this information may be used as means to ensure a representative geographical or topological sample size. Geographical and/or topological information can be stored as node attributes.

The graph edges, i.e. the connections between the nodes, represent in this case traffic between the nodes. In the FIG. 3a example it can flow traffic between any two nodes, but it does not necessarily do so. Graph edges are only created if traffic is registered between two nodes. FIG. 3 shows for example no edge between $S_6$ and $S_1$ because traffic has not yet been registered between these two nodes.

If the nodes $S_1$-$S_6$ represent web pages, the intensity in traffic between them may be represented by the number of referrals from the one page to the other. Data representing traffic, in FIG. 3a indicated with parameter $N_i$, can be stored as edge attributes. Sometimes it will be useful to register traffic in both directions, as shown using arrows between $S_2$ and $S_4$. In this example $N_{2-4}$ represent the number of lookup's from $S_2$ to $S_4$, while the $N_{4-2}$ may represent the number of lookup's from $S_4$ to $S_2$. Other times it may be more appropriate to only register one traffic parameter per edge, for example shown by $N_2$, in this case representing the number of lookup's on $S_1$ from $S_2$, if lookup's in the other direction, i.e. lookups at S2 from S1, is seen as irrelevant for the analysis.

When a user session is terminated, for instance caused by the user on user terminal 300 in FIG. 1 navigating to other web pages outside the scope of the survey/analysis or hangs up the phone in a telecommunication service, the survey generator (FIG. 4) may use all edges ending up at the user terminal 300 (i.e. all nodes with the terminal's IP address or telephone number as described above) to send a questionnaire only including questions regarding content or services accessed by user terminal 300. The response to the resulting questionnaire, with or without user participation, can be stored in separate attributes on the edges and/or nodes.

The distribution of traffic parameters on the edges will be updated during periods where traffic is recorded. For example may the number of $N_5$ lookups from node $S_5$ in periods where traffic is registered prove to be much greater than $N_2$ even though traffic was registered from node $S_2$ before it was registered from $S_5$. In the subsequent analysis the distribution of traffic parameters is usually regarded to be more interesting than the exact order the nodes were created.

The overall figures from all edges for a given node can also be interesting. For example may a large number of lookups from a number of user terminals on a particular webpage, such as $S_1$, indicate that this particular webpage should be optimized and/or contain very relevant information. Both cases can be useful information to the owner of the webpage $S_1$.

Traffic attributes, such as the number of hits on a webpage, as in the above example, response times and/or other traffic parameters are stored in attributes on the edges during a measurement period. A measurement period contains a sufficient number of user sessions ensuring that the results are representative based on a set of predetermined criteria.

Nodes and edges in the graph can favourably be represented in a database, such as a relational database with a node table where each row represents a node, and the columns represent attributes. Correspondingly, the edges in the graph can be represented by an edge table where a first key column referring to one end of the node's edge, a second key column referring to the other end of the node, and a number of columns representing the edges attributes. Since a table may contain a large number of columns containing various types of content, both nodes and edges may contain a large number of attributes with different types of content. Furthermore, it would be clear to a professional that new table rows in a relational database can be added as nodes or edges are added, and that this beneficially can be done in accordance with adding nodes and edges in a graph rather than as branches of a tree or connections in a network. For example, the first key column may point to the source node while the other key column can point to the destination node, so that two nodes can thus be connected by two edges representing traffic in each direction. It should also be easy to see that such a graph described above can be implemented in other types of databases or in separate data structures. If nodes and edges as described above is represented in a database, conventional database mechanisms such as indexing and query tools used for efficient retrieval of all services accessed by a user terminal 300 (FIG. 1), for example identified by all nodes with a given IP address or phone number as described, and the corresponding nodes (web pages or services) at the other end of the edge going to the user terminal 300. Standard database mechanisms can also be used to retrieve various attributes of nodes and edges to graphically represent the results, for example find all nodes that have the same IP address as in the above example involving web sites.

It is known to the person skilled in the art that data stored in periods where traffic is recorded may include a mixture of raw data and cumulative values for statistical purposes. In the above example involving web sites it may be desirable to keep an easily available copy of the web pages the user has accessed until the data is analyzed. The reason for this is that many websites contain dynamic content, such as a commercial advertisement that change for every page reload. It may in some cases be interesting to examine whether there are significant correlations between the response and the actual page content, for example if a commercial advertisement works better than another on an otherwise similar webpage.

Figure 3B:
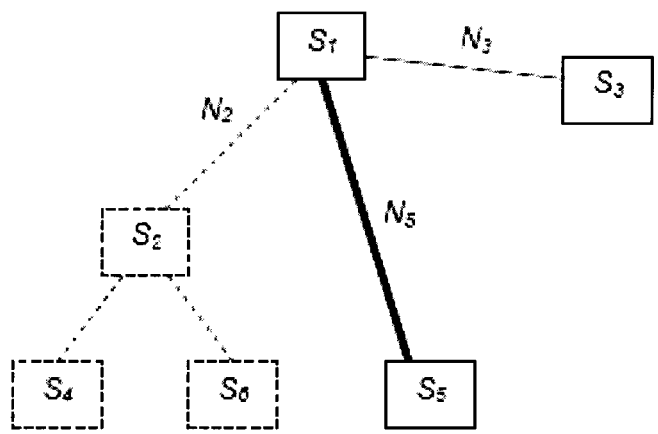
FIG. 3b illustrates an alternative representation of data in a graph.

FIG. 3b shows one way of displaying the graph in FIG. 3a, and illustrates how data appropriately can be presented. For example, geographic and/or topological location of nodes in a network can be registered on the nodes, and FIG. 3b may represent a network map. The connection from the source $S_1$ to $S_2$ onwards in FIG. 3b, is shown with dotted lines to indicate that the registered traffic parameters on the edges indicate some sense of poor performance. If $N_2$ represents the number of hits from a site $S_2$ the poor performance may be explained by the fact that $S_2$ is not particularly relevant as advertising medium for the content of $S_1$. Similarly, the connection between $S_1$ and $S_3$ is shown with a solid thin line and the connection between $S_1$ and $S_4$ is shown with a solid thick line. This illustrates that the forward positions of the edges in a graph can indicate the value or the interval of values for the intensity or other traffic parameters that are stored on the edges. In the above example involving web sites the thickness and appearance of the bars indicate the volume of hits $N_2 < N_3 < N_5$.

The tree in FIG. 3b can be stretched out from the graph in FIG. 3a using known algorithms, such as a "spanning tree" algorithm finding the "shortest route" through all nodes in a planar graph. For example, a tree as shown in FIG. 3b may represent the result of a website analysis where $N_2$ represents the number of hits from a webpage $S_2$ as described above. The bad performance in this case could be that $S_2$ is poorly coded or not perceived as relevant by a user. To the owner of $S_1$ this may be relevant since $S_2$ seems irrelevant as an advertising medium for the content of $S_1$. To the owner of $S_2$ it may for example be interesting to investigate further whether the encoding of $S_2$ should be improved.

Furthermore, the presentation of data collected in the graph in FIG. 3a does not need to be displayed in form of a tree as shown in FIG. 3b. For example, suppose the nodes in FIG. 3b is correctly placed geographically in relation to each other. Instead of the tree structure shown in FIG. 3b, the collected data could be presented in a mesh with connections between the nodes $S_4$ and $S_6$, between $S_6$ and $S_5$, between $S_5$ between $S_3$, etc., or that the performance is poor in some other way in this geographical area. If the nodes represent web pages and the nodes placement in the presentation indicates geographic location, the dotted part through $S_2$ may alternatively indicate that data from an area is missing.

Data captured during the registration period and the subsequent analysis may of course be presented in any other way serving the purpose. These ways of presenting data will be well known to a professional and is therefore not described in further detail.

Figure 4:
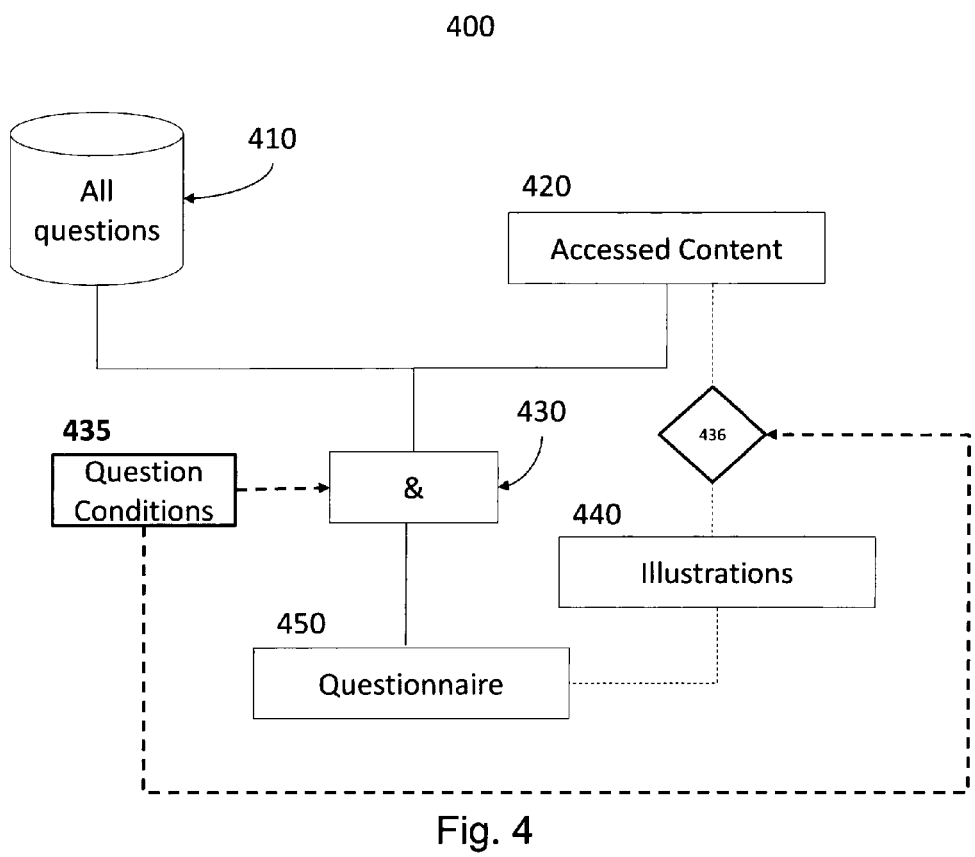
FIG. 4 illustrates the principle for a questionnaire generator.

FIG. 4 illustrates a questionnaire generator 400.

"Database" 410 represents the quantity of information of all parameters for all services and content. It should be understood that the "database" 410 can be represented by a list, a database or any other suitable format.

"Questions" are defined as an ordered pair {SERVICE, PARAMETER}, where SERVICE describes service and/or content from a provider. SERVICE thus also includes content on a Web page in some aspects. Some parameters require input from a user via a keyboard or other input devices, while other parameter values, e.g. different measurement of time, can be completed by the user terminal without human involvement.

In block 420 a list is added of which content and/or services a user terminal 300 (FIG. 1) has accessed.

In block 430 an incision is made between the quantities of all the questions from the block 410 and the amount of accessed content from block 420. Formally, this is the subset of questions (ordered pairs {SERVICE, PARAMETER}) from 410 where SERVICE occurs in block 420. Output is, in other words, a list of questions that exist among all the possible questions (410) AND concerning the content from block 420. The resulting questionnaire therefore includes questions about services and/or content accessed by the appropriate user terminal 300 (FIG. 1), and not questions about services and/or content not accessed. The questionnaire can in addition include questions of a general nature, but it is emphasized that the purpose of the questionnaire in the presented invention is to avoid irrelevant questions about content and services that has not been accessed.

Question Conditions

In 435 the conditions are obtained for which situations one or more questions are to be included in 450. 435 is thus called Question Conditions, and may include, but are not limited to, which output data delivered from 430. Examples of conditions can be based on the amount of content accessed, time of access, the order of accessed content, type of content or content elements, objects, text, etc. from 420, physical or logical groups of content, which may be part of the supplier's website (for example, the category "products"), individual WebPages and/or items on the webpage or website (for example "shopping cart" or an advertisement), and the combination of such conditions. What types of conditions that can be included is not limited to the mentioned examples. A combination can for example mean that a certain type of webpage has been accessed, but not another type of webpage. In this example the corresponding questions from the selection from 410 will be selected in 430 based on input data from 435.

In block 440 (optional) the questionnaire may be illustrated with content from block 420. This illustrative content may be one or more miniaturized screenshots of web pages that will be presented to a human user in relation to one or more questions in the generated questionnaire. This type of illustrative content may be unnecessary in other applications, and block 440 is therefore drawn with dotted lines to illustrate that it is optional.

In block 450 is the final questionnaire available, i.e. a list of requests for parameters that can be presented in a user terminal 300, and contains only questions about the parameters of the accessed content from block 420.

Figure 5:
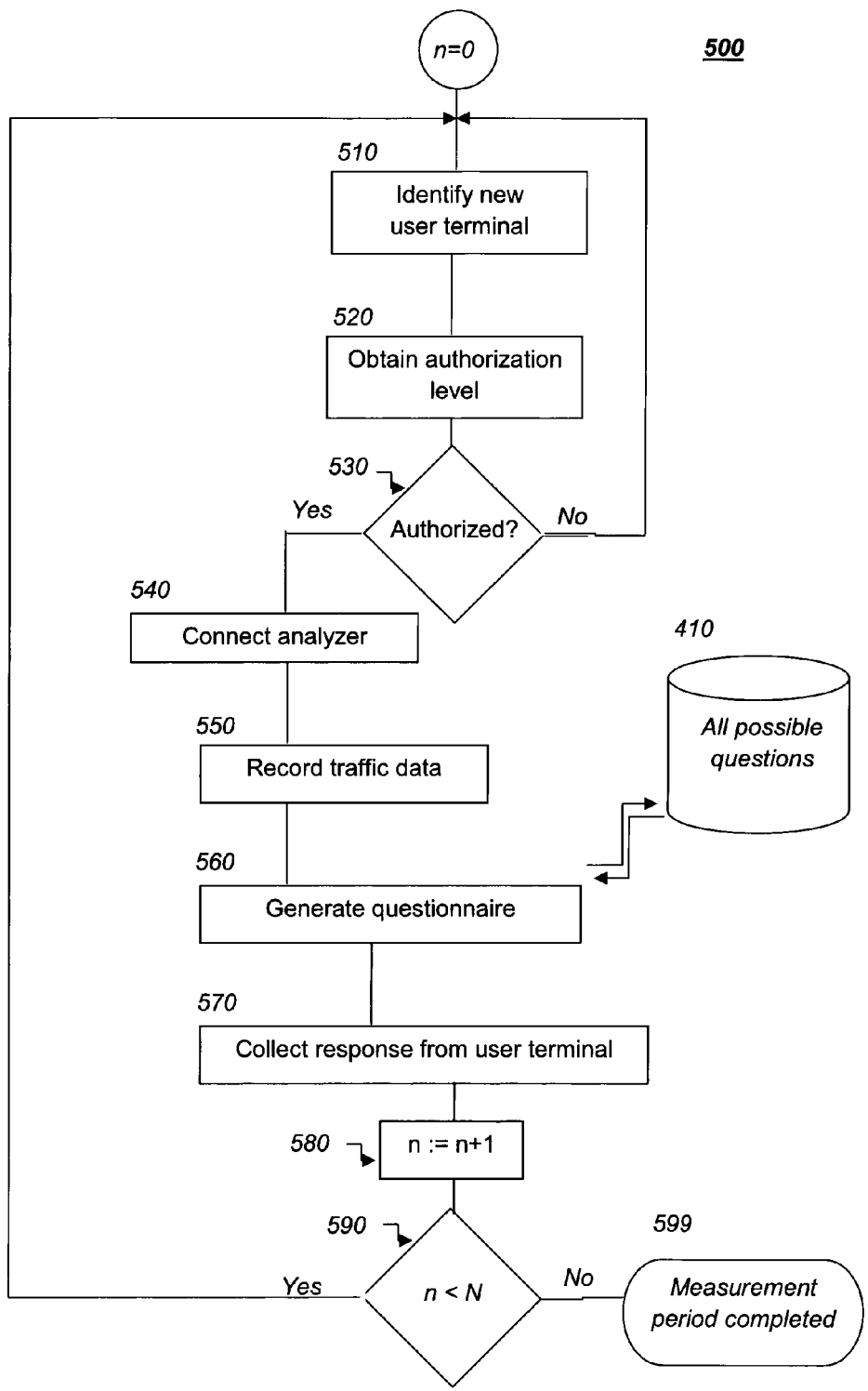
FIG. 5 shows a method for collecting data.

FIG. 5 is a block diagram describing a method 500 for collecting data in a measurement period, according to the invention.

The measurement period begins with n=0 respondents.

In block 510 a new user terminal is identified. Identification can be based on IP address, port number and/or the Web page accessed.

In block 520 is the authorization level obtained. Authorization can be obtained before the measurement period begins, for example when a user has agreed to join a user group/panel etc., as described in relation to FIG. 2. In this case, the relevant information, such as gender, age etc. can be stored as shown at 240 in FIG. 2. Requests for authorization may also be sent in the measurement period, e.g. to ensure a representative sample with regard to gender, age, residence and other (demographic) data that can be possible explanation parameters in the study.

In block 530 is authorization verified, i.e. if the user allows the collection and storage of traffic data. If authorization is given before the measurement period begins, this step will only include verifying if authorization already has been given. Otherwise, the system will attempt to obtain authorization from the user as shown in FIG. 2. If authorization is not given, or the authorization level is not high enough at the end of step 530, a new user terminal is identified.

If the authorization level is sufficient an analyzer 100 (FIG. 1) will logically be connected between the content source and the user terminal 300 in step 540. Step 540 may thus correspond to the beginning of the session 280 as shown in FIG. 2.

In block 550 are traffic data from the session recorded and stored on the analyzer. HTML, XML and/or java scripts from a website is handled in such a way that it looks exactly like the web page, stored together with the user terminal's IP address, port number etc., and the content source's ID, e.g. IP address, port number and/or URI, as described in relation to FIG. 3 above.

In block 560 is the recorded traffic data used to generate a traffic-based questionnaire. The amount of all possible questions represented by 410 is the same as that described in relation to FIG. 4 above. The two arrows between 560 and the amount of questions 410 illustrates that a questionnaire generator in block 560 extracts questions regarding web pages or services accessed from the session in question. Questions extracted in this way are added to a questionnaire.

In block 570 are responses from the user terminal 300 collected using the questionnaire, and in block 570 is the number of responses increased by 1, i.e. from n to n+1.

The method involves collecting and storing N sets traffic data and responses from user terminals, where N is an integer ≥1. Test 580 determines whether fewer than N responses are obtained, i.e. if n<N. If the predetermined number of N responses is not collected, the process returns to block 510 for identification of a new user terminal. If the predetermined number N user responses with traffic data are obtained, the measurement will end, and the process proceeds to data analysis (not shown in FIG. 5).

Figure 6:
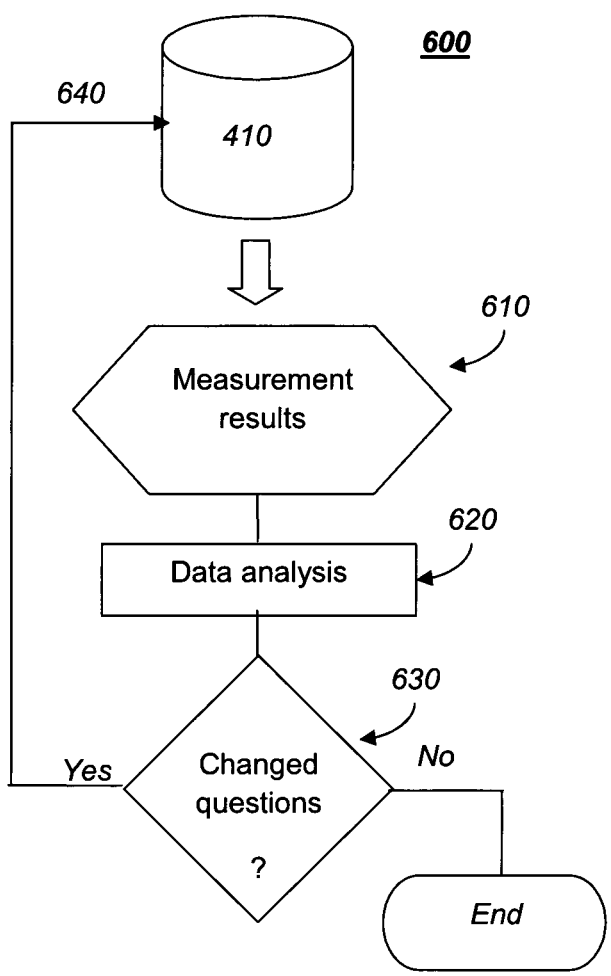
FIG. 6 shows a feedback loop.

FIG. 6 illustrates a feedback loop that uses the results of the analysis to influence the questions that can be used in the questionnaire. The purpose may be to conduct further investigations and/or to increase the precision level of the questions in a given study. This can be done by adding, deleting or changing the questions that are considered relevant for a given service or Web page.

A database 410 contains the set of possible questions, and is further described in relation to FIG. 4. The content of the set of questions affects the results as shown in FIG. 4 and is illustrated with a broad arrow in FIG. 6.

Measurement results 610 may be available in a measurement period (n<N in FIG. 5). They can be analyzed, for example to monitor a sample of respondents to ensure that data collection is not completed before the sample is sufficiently representative. The test results 610 may alternatively be the collection of traffic data and responses from the questionnaire that exists when a measurement period is completed as shown at 599 in FIG. 5.

In block 620 the measurement results 610 are analyzed using known methods, such as statistics. The results of the analysis may be presented in an appropriate form such as e.g. a web interface on a user terminal. Analysis and presentation is beyond the scope of the presented invention and is therefore not described in further detail here.

In block 630 it is decided if, and if so which, parameters to be included in a new questionnaire for further analysis determined. Formally changing the amount of available questions or ordered pairs {SERVICE, PARAMETER} in the set of possible questions 410. The assessment in 630 will in many cases include a human review, for instance by presenting the findings from the analyses on a screen, that an expert prepare new questions for specific services depending on which areas are in need of additional data, and that the expert adds the new questions into a database 410 using a known user terminal, e.g. a PC. Questions can also be changed automatically, e.g. by automatically collecting more data containing certain parameters to achieve a predetermined distribution, or a representative sample of respondents.

Arrow 640 illustrates that the questions are created, deleted or changed in the volume 410 for later use.

Figure 7:
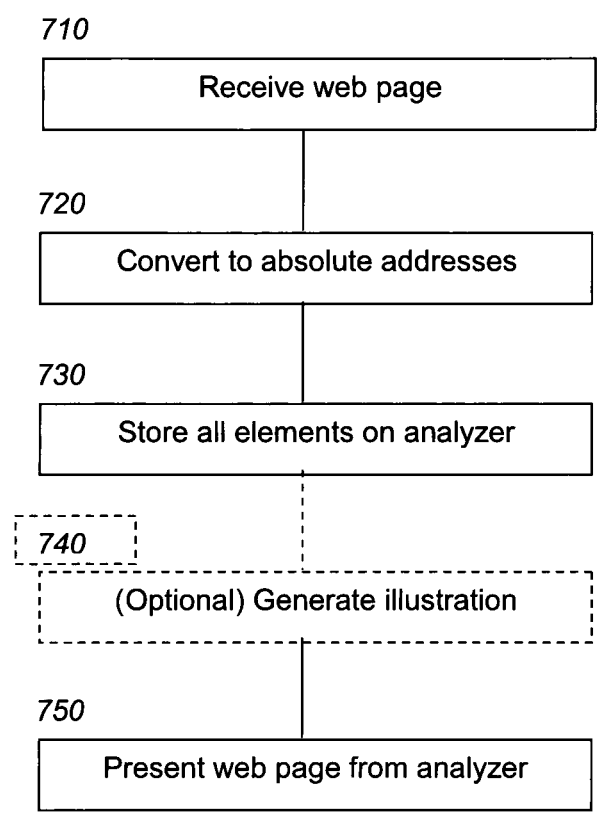
FIG. 7 shows one usage aspect in an analyzer 100 for web-based content.

FIG. 7 shows a method for use in an analyzer 100 for web-based content.

In step 710 a web page is received from the content source 200. The Web page content may include time-dependent content, e.g. advertisements that change on page reload. Web page code will often contain a mixture of HTML, XML and/or JavaScript, and style sheets (CSS) that define fonts, margins, colour schemes and different appearance at several pages on the same web site. Java Script and any other code that is executed in a browser on a user terminal can be decoded in this step.

In step 720 are the suppliers' addresses transformed to addresses that have meaning outside the supplier's Web server. For example, some or all relative addresses can be converted to absolute addresses. In the example of an advertising banner, which varies on reload, e.g. relative address '/products/something.php & id=123' converted to 'dummy-domain.com/products/something.php & id=123'. The implementation determines whether all the addresses to be transformed. For example, a reference to styles, '/css/stylesheet.css' remain relative.

In step 730 are all items on the website of the analyzer 100 stored in such a way that the provider's web page can be regenerated by the analyzer 100 and presented to a user terminal 300. For example, styles, etc. filed relatively under/css/stylesheet.css also on the analyzer 100, or they can be retrieved from an absolute address outside the analyzer 100.

In block 740 (optional) is an illustration of the website generated. The illustration may be useful in obtaining certain parameters, such as questions about the subjective perception of the "Was the content of the page to the left (illustration) <relevance>". For the illustration to be readable in all browsers and/or in a reduced size, it is advantageous to create an image of the website, for example, in a standardized format like JPEG or PNG. In other contexts it may be more appropriate to use different portable formats, such as Adobe Portable Data Format (PDF) for illustration.

In this example, the parameter <relevance> may be presented as a list of valid parameter values, e.g. numbers 1-5, the set {"useful," "neither useful or useless," "useless"}, etc. The parameters and values affecting the given web page is retrieved from the set of possible questions 410 and presented in a questionnaire together with the illustration as shown in FIG. 4.

In block 750 questions presented to the user based on content stored in the analyzer 100. The browser on the user terminal 300 must therefore have access to items that may have a different relative location than the ones on the content provider's website. The web page must in other words be represented in such a way that it can be regenerated exactly the same way as the user saw it on the provider's website.

Changed Content

Figure 8:
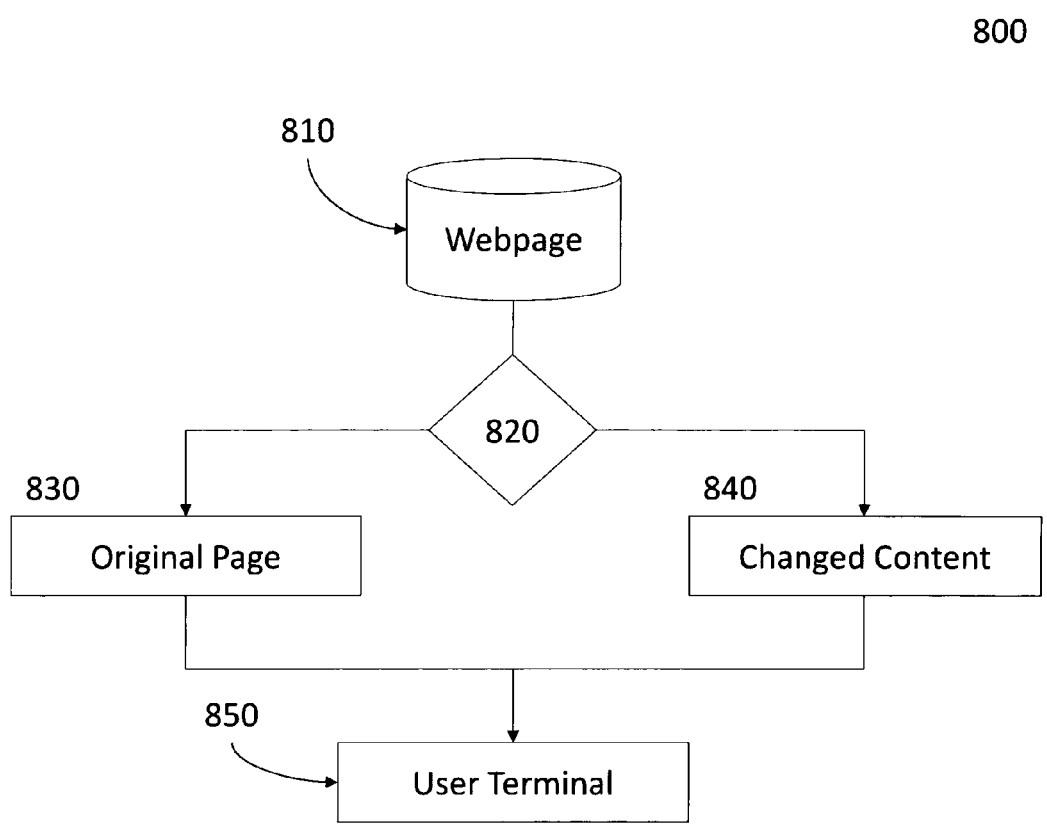
FIG. 8 shows examples of alterations made by supplier to content on users Web pages.

FIG. 8 shows an aspect of the invention in which the supplier's Web page 810 could appear completely or partially changed on the user terminal.

In another aspect according to the invention the supplier's Web page 810 can appear completely or partially changed in the user terminal. The reason for such an application could be that the supplier wants to change, replace or otherwise affect the entire or parts of the website/webpage, or any item/object including design, language, format, design, coding, although not limited to these examples. Such changes will onwards generically be referred to as Changed Content. An example of an application is that a selection of user terminals is presented the Web page with Changed Content, and another selection is presented the original page, where the questionnaire will be designed in accordance to which version the user terminal received. In such an application, the supplier will be able to measure the difference between the two presentations. Examples of such an application could be to replace the advertisement with another, change the colour scheme/style, but are not limited to these examples.

Block 800 illustrates Web page 810 which through a logical test 820 choose which webpage to be sent to 850 user terminal, either 830 the original page or 840 the Changed Content. Test 820 is made up from parameters in the system set by the supplier prior to the traffic analysis.

The invention claimed is:

1. A system for data traffic content analysis comprising an analyzer, a content source and an user terminal,
   wherein the analyzer is arranged between the content source and the user terminal, and an authorization mechanism is adapted to allow a connection of the analyzer in a data traffic flow between the content source and the user terminal if authorization is obtained for the connection, and where the analyzer comprises:
   a storage device adapted to store at least parts of the data traffic;
   a questionnaire generator with traffic data as input data and a questionnaire with requests regarding relevant parameters based on the traffic data as output data, and
   a communication device to obtain the response from the user terminal, the response being based on the questionnaire.

2. The system according to claim 1,
   further comprising means for acquisition and analysis of a number of user responses.

3. The system according to claim 1,
   where the questionnaire generator is logically connected with a database comprising a plurality of questions in the form of ordered pairs {SERVICE, PARAMETER} where SERVICE represents a SERVICE or a content which shall be the subject of an analysis and PARAMETER represents a measuring parameter for SERVICE, the setting comprising all values for SERVICE which shall be analyzed and at least one parameter per SERVICE.

4. The system according to claim 1,
   further comprising conditional test means for carrying out a logical test where Web pages represent input data and the output represents original Web pages (830) routed to a user terminal, or the output represents changed Web pages routed to a user terminal.

5. The system according to claim 4,
   where the conditional test means is constructed from system parameters set by a supplier prior to the data traffic analysis.

6. A method for data traffic content analysis of data traffic between a content source and a user terminal comprising steps of:
   identifying a user terminal;
   obtaining authorization for acquisition and storage of traffic data;
   controlling whether authorization is obtained, and if authorization is obtained:
   connecting an analyzer between the content source and the user terminal;

recording and storing at least some traffic data on the analyzer;

using the recorded traffic data to generate a data traffic based questionnaire, and collecting responses from the user terminal using the questionnaire.

7. The method according to claim 6, further comprising acquiring and analyzing a plurality of responses.

8. The method according to claim 7, further comprising establishing a graph with Web pages as nodes and edges representing data traffic between Web pages based on the user responses, where each node and each edge includes at least one attribute.

9. The method according to claim 6, further comprising establishing a graph with Web pages as nodes and edges representing data traffic between Web pages based on the user responses, where each node and each edge includes at least one attribute.

10. The method according to claim 7, further comprising revising questions and updating a set with possible questions.

11. The method according to claim 6, where recording traffic data comprises:

receiving a Web page from the content source;

converting relative addresses to absolute addresses;

storing all elements of the Web page in the analyzer, and forwarding the Web page from the analyzer to the user terminal.

12. The method Method according to claim 11, further comprising generating an illustration of the received Webpage in an image format.

13. The method according to claim 11, further comprising decoding executable code on the Web page for generation of static XML code for presentation.

14. The method according to claim 6, further comprising the steps of:

carrying out a conditional logical test where Web pages represent input data and the output represents the original Web pages routed to a user terminal, or the output represents the changed Web pages routed to a user terminal.

* * * * *